(12) United States Patent
Zhu et al.

(10) Patent No.: US 10,459,137 B2
(45) Date of Patent: Oct. 29, 2019

(54) METAL WIRE GRID POLARIZATION PLATE AND MANUFACTURING METHOD THEREOF, DISPLAY PANEL AND DISPLAY DEVICE

(71) Applicant: BOE TECHNOLOGY GROUP CO., LTD., Beijing (CN)

(72) Inventors: Ming Zhu, Beijing (CN); Yafeng Yang, Beijing (CN); Zhen Liu, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 177 days.

(21) Appl. No.: 15/244,375

(22) Filed: Aug. 23, 2016

(65) Prior Publication Data
US 2017/0205550 A1  Jul. 20, 2017

(30) Foreign Application Priority Data
Jan. 15, 2016 (CN) .......................... 2016 1 0029288

(51) Int. Cl.
G02B 5/30 (2006.01)
G02F 1/1335 (2006.01)
G02B 5/00 (2006.01)

(52) U.S. Cl.
CPC .......... *G02B 5/3058* (2013.01); *G02B 5/003* (2013.01); *G02F 1/133528* (2013.01); *G02F 2001/133548* (2013.01)

(58) Field of Classification Search
None
See application file for complete search history.

(56) References Cited

U.S. PATENT DOCUMENTS

| | | | | |
|---|---|---|---|---|
| 4,759,611 A | * | 7/1988 | Downey, Jr. ......... | G02B 5/3033 349/122 |
| 2003/0210369 A1 | * | 11/2003 | Wu ................... | G02F 1/133555 349/114 |
| 2007/0242352 A1 | * | 10/2007 | MacMaster ......... | G02B 5/3058 359/485.05 |
| 2009/0290105 A1 | * | 11/2009 | Takada .............. | G02F 1/133528 349/96 |
| 2012/0140148 A1 | * | 6/2012 | Kadowaki ........... | G02B 5/3058 349/64 |

(Continued)

FOREIGN PATENT DOCUMENTS

| CN | 101876722 A | 11/2010 |
|---|---|---|
| CN | 101908478 A | 12/2010 |

(Continued)

OTHER PUBLICATIONS

Second Chinese Office Action dated Jan. 17, 2018.
First Chinese Office Action dated Jun. 15, 2017.

*Primary Examiner* — Edward J Glick
*Assistant Examiner* — David Y Chung
(74) *Attorney, Agent, or Firm* — Dilworth & Barrese, LLP.; Michael J. Musella, Esq.

(57) ABSTRACT

A metal wire grid polarization plate and a manufacturing method thereof, a display panel and a display device are provided. The metal wire grid polarization plate includes a substrate, a light absorption wire grid and a metal wire grid. The light absorption wire grid is disposed on a side of the substrate, and the metal wire grid covers the light absorption wire grid.

5 Claims, 4 Drawing Sheets

(56) References Cited

U.S. PATENT DOCUMENTS

| | | | | |
|---|---|---|---|---|
| 2014/0029096 A1* | 1/2014 | Kessler | ............... | G02B 27/26 |
| | | | | 359/465 |
| 2015/0103032 A1* | 4/2015 | Bell | ............... | G06F 3/044 |
| | | | | 345/174 |
| 2016/0124265 A1* | 5/2016 | Lee | ............... | G02F 1/133528 |
| | | | | 349/43 |

FOREIGN PATENT DOCUMENTS

| CN | 102033417 A | 4/2011 |
|---|---|---|
| CN | 10263897 A | 8/2012 |
| WO | 2015057467 A | 4/2014 |

\* cited by examiner

METAL WIRE GRID POLARIZATION PLATE AND MANUFACTURING METHOD THEREOF, DISPLAY PANEL AND DISPLAY DEVICE

TECHNICAL FIELD

Embodiments of the present disclosure relate to a metal wire grid polarization plate and a manufacturing method thereof, a display panel and a display device.

BACKGROUND

LCD (Liquid Crystal Display) occupies an important position in the field of flat panel display because of its advantages of small weight, small thickness, low power consumption, high brightness and high display quality etc. The LCD includes an array substrate, an opposite substrate and a backlight source etc. The array substrate is disposed between the opposite substrate and the backlight source, and both the opposite substrate and the array substrate are provided with polarization plates. For example, the polarization plates are metal wire grid polarization plates.

SUMMARY

According to embodiments of the disclosure, a metal wire grid polarization plate comprising a substrate, a light absorption wire grid and a metal wire grid is provided. The light absorption wire grid is disposed on a side of the substrate, and the metal wire grid covers the light absorption wire grid.

For example, the light absorption wire grid absorbs light irradiating from the other side of the substrate and having a vibration direction not parallel to a direction of the metal wire grid.

For example, the light absorption wire grid comprises lines which are disposed at equal interval and parallel to each other, and the metal wire grid comprises metal lines which are disposed at equal interval and parallel to each other, and the lines of the light absorption wire grid and the metal lines of the metal wire grid correspond to each other one by one.

For example, a width of each line of the light absorption wire grid is equal to a width of each metal line of the metal wire grid.

For example, the light absorption wire grid is made of copper oxide or chromium oxide.

For example, the metal wire grid is made of aluminum, silver, platinum, gold or a metal compound.

For example, the substrate is made of glass, silicon or resin.

According to embodiments of the disclosure, a manufacturing method of a metal wire grid polarization plate is provided. The method comprises: forming a light absorption layer on a side of a substrate; forming a metal layer on the light absorption layer; and patterning the metal layer and the light absorption layer to form a metal wire grid and a light absorption wire grid.

For example, forming the light absorption layer on the side of the substrate comprises: depositing copper or chromium on the substrate; oxidizing the copper or the chromium to form the light absorption layer.

For example, depositing the copper or the chromium on the substrate comprises: depositing the copper or the chromium on the substrate through a magnetron sputtering method.

For example, oxidizing the copper or the chromium comprises: oxidizing the copper or the chromium on the substrate by using plasma.

For example, the plasma is oxygen plasma.

For example, patterning the metal layer and the light absorption layer to form the metal wire grid and the light absorption wire grid comprises: forming a photoresist on the metal layer; patterning the photoresist to form a photoresist wire grid; etching the metal layer and the light absorption layer not covered by the photoresist wire grid to form the metal wire grid and the light absorption wire grid; and stripping off the photoresist wire grid to form the metal wire grid polarization plate.

For example, patterning the photoresist to form the photoresist wire grid comprises: patterning the photoresist by a nano imprinting method to form the photoresist wire grid.

For example, etching the metal layer and the light absorption layer not covered by the photoresist wire grid comprises: employing the photoresist wire grid as a mask to etch the metal layer and the light absorption layer which are not covered by the photoresist wire grid by using an electron beam.

According to the embodiments of the disclosure, a liquid crystal display panel is provided. The liquid crystal display panel comprises the metal wire grid polarization plate as described above.

For example, the liquid crystal display panel further comprises: an array substrate and an opposite substrate which are disposed to face each other and a liquid crystal layer disposed between the array substrate and the opposite substrate, wherein the metal wire grid polarization plate is disposed between the opposite substrate and the liquid crystal layer, and the light absorption wire grid of the metal wire grid polarization plate is provided to be closer to the opposite substrate than the metal wire grid.

According to the embodiments of the disclosure, a display device is provided. The display device comprises the liquid crystal display panel as described above.

BRIEF DESCRIPTION OF THE DRAWINGS

In order to clearly illustrate the technical solution of the embodiments of the disclosure, the drawings of the embodiments will be briefly described in the following, it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

For example, a metal wire grid polarization plate includes a substrate and a metal wire grid, the metal wire grid comprises a plurality of metal lines disposed on a surface of the substrate at equal interval, and the plurality of metal lines are parallel to each other. The light emitted from the backlight source includes light rays vibrating in all directions, and the light ray having a vibration direction parallel to the direction of the metal lines of the metal wire grid passes through the gap between the metal lines and form a polarized light; and the light ray having the vibration direction not parallel to the direction of the metal lines of the metal wire grid can not pass through the gap between the metal lines and is reflected by the surface of the metal wire grid polarization plate.

The inventors found that, the ambient light comprises lots of light rays having the vibration direction not parallel to the direction of the metal lines of the metal wire grid, and the lots of light rays are reflected by the metal wire grid polarization plate disposed on an opposite substrate, which results in that the contrast ratio of the image displayed by a liquid crystal display panel decreases significantly.

Figure 1:
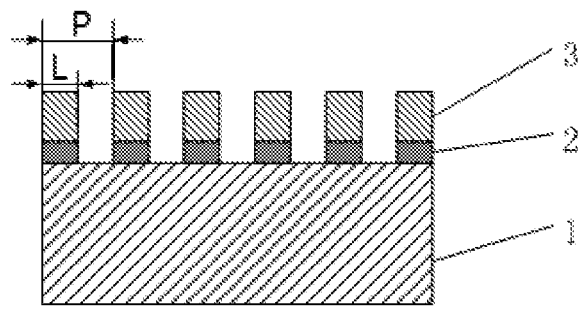
FIG. 1 is a schematic structure diagram of a metal wire grid polarization plate provided by embodiments of the present disclosure.

As shown in FIG. 1, a metal wire grid polarization plate is provided by embodiments of the present disclosure, the metal wire grid polarization plate includes a substrate 1, a light absorption wire grid 2 and a metal wire grid 3, the light absorption wire grid 2 is disposed on a side of the substrate 1, and the metal wire grid 3 covers the light absorption wire grid 2.

In the embodiments of the present disclosure, the light absorption wire grid 2 is disposed on the side of the substrate 1, the metal wire grid 3 covers the light absorption wire grid 2, and the light absorption wire grid 2 absorbs the light irradiating from the other side of the substrate (which is opposite to the side of the substrate disposed with the light absorption wire grid 2) and having the vibration direction not parallel to the direction of the metal wire grid 3. Thus, in the case that the metal wire grid polarization plate is provided in the liquid crystal display panel, the situations that lots of ambient light are reflected by the liquid crystal display panel and the contrast ratio of the image displayed by the liquid crystal display panel is reduced can be prevented.

Figure 2:
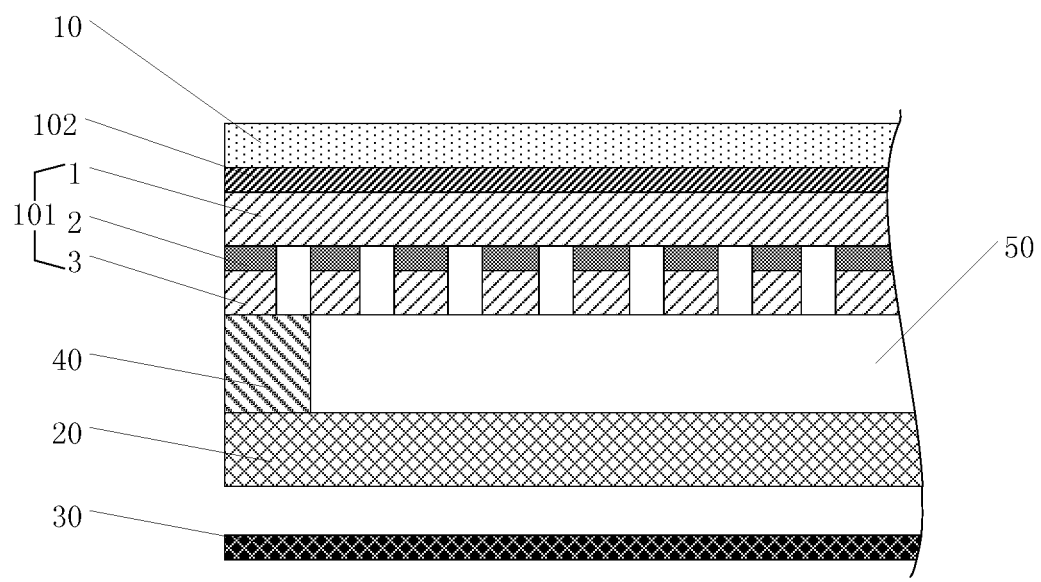
FIG. 2 is a schematic structure diagram of a liquid crystal display panel provided by the embodiments of the present disclosure.

As shown in FIG. 2, the liquid crystal display panel includes a liquid crystal cell 40 and a backlight source 30, the liquid crystal cell 40 includes an opposite substrate 10, a liquid crystal layer 50 and an array substrate 20, the opposite substrate and the array substrate 20 are disposed to face each other and the liquid crystal layer 50 is disposed between the opposite substrate 10 and the array substrate 20, and the backlight source 30 is disposed on a side of the array substrate 20 away from the opposite substrate 10. For example, the opposite substrate 10 is a color filter substrate and the color filter substrate includes a color filter 102. The metal wire grid polarization plate 101 according to the embodiments of the present disclosure is provided on a side of the opposite substrate 10 facing to the array substrate, so that the problem that the contrast ratio of the display image of the liquid crystal display panel is reduced can be solved.

In the case that the metal wire grid polarization plate provided by the embodiments of the present disclosure is provided in the liquid crystal display panel, the optical path of the light emitted from the backlight source 30 and the optical path of the ambient light are as follows:

The light emitted from the backlight source 30 passes through the array substrate 20 and the liquid crystal layer 50 and irradiates onto the metal wire grid polarization plate 101; among the light emitted from the backlight source 30, the light rays having the vibration direction parallel to the direction of the metal wire grid 3 sequentially pass through the metal wire grid 3, the light absorption wire grid 2, and the substrate 1 and then emit from the opposite substrate 10 to form the image of the liquid crystal display panel, and the light rays having the vibration direction not parallel to the direction of the metal wire grid 3 are reflected by the metal wire grid 3 and then interact with the array substrate 20.

The ambient light comprises a lot of polarized light, and the ambient light irradiates from a side of the substrate 1 not provided with light absorption wire grid 2 onto the metal wire grid 3. Among the ambient light, the light rays having the vibration direction parallel to the direction of the metal wire grid 3 sequentially pass through the substrate 1, the light absorption wire grid 2, and the metal wire grid 3 and then irradiate into the liquid crystal layer 50, and the light rays having the vibration direction not parallel to the direction of the metal wire grid 3 are absorbed by the light absorption wire grid 2, therefore the case that lots of ambient light are reflected on the liquid crystal display panel is avoided, and thus the problem that the contrast ratio of the display image of the liquid crystal display panel is reduced is solved.

Figure 3:
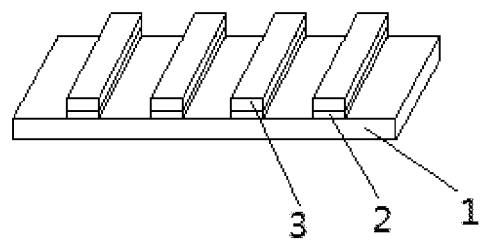
FIG. 3 is a schematic stereoscopic structure diagram of the metal wire grid polarization plate provided by the embodiments of the present disclosure.

As shown in FIG. 1 and FIG. 3, in the embodiments of the present disclosure, the light absorption wire grid 2 comprises lines made of light absorption material which are disposed on the substrate 1 at equal interval and are parallel to each other, the metal wire grid 3 comprises metal lines which are disposed on the light absorption wire grid 2 at equal interval and are parallel to each other, and the lines made of light absorption material of the light absorption wire grid 2 and the metal lines of the metal wire grid 3 correspond to each other one by one. The metal lines of the metal wire grid 3 cover the lines made of light absorption material of the light absorption wire grid 2, an extension direction, a pitch P and a line width L of the light absorption wire grid 2 are equal to those of the metal wire grid 3, so that the light absorption effect of the light absorption wire grid 2 is ensured and the polarization effect of the metal wire grid 3 is not adversely influenced by the light absorption wire grid 2.

In the embodiments of the present disclosure, for example, the light absorption wire grid 2 is made of copper oxide or chromium oxide. Copper oxide and chromium oxide are black metal oxides, and their light absorption performance is good. It is easier to form copper oxide, so the production cost is reduced in the case that the light absorption wire grid 2 is made of copper oxide. Of course, it should be understood by those skilled in the art that, the light absorption wire grid 2 in the embodiments of the present disclosure may be made of other materials having light absorbing performance.

In the embodiments of the present disclosure, for example, the metal wire grid 3 is made of aluminum, silver, platinum, gold, a metal compound and the like, which have good reflective properties. Among the light irradiated onto the metal wire grid polarization plate, the light rays having the direction not parallel to the direction of the metal wire grid 3 are reflected by the metal wire grid 3, the reflected light rays are repeatedly reflected between the opposite substrate and the array substrate to supplement light rays for the backlight source and increase the utilization rate of the light emitted from the backlight source. For example, the metal wire grid 3 is made of aluminum, which has a better reflective effect and a lower cost.

In the embodiments of the present disclosure, for example, the substrate 1 is made of glass, silicon or resin, and the substrate 1 is a transparent substrate.

Figure 4:
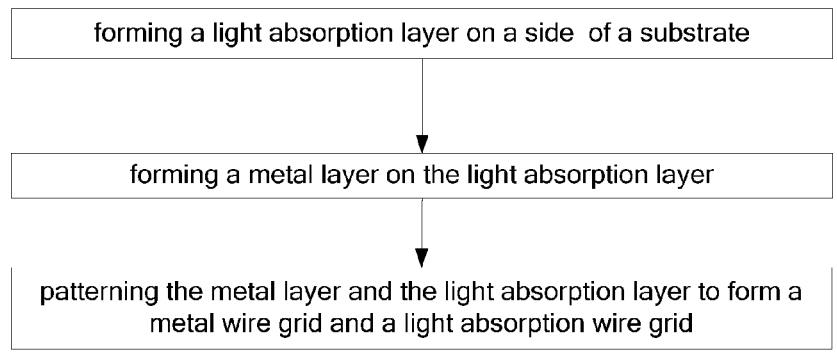
FIG. 4 is a flow diagram of a manufacturing method of a metal wire grid polarization plate provided by the embodiments of the present disclosure.

As shown in FIG. 4, a manufacturing method of the metal wire grid polarization plate is provided by the embodiments of the present disclosure to manufacture the metal wire grid polarization plate as described above. For example, the manufacturing method of the metal wire grid polarization plate includes the following steps.

Figure 5:
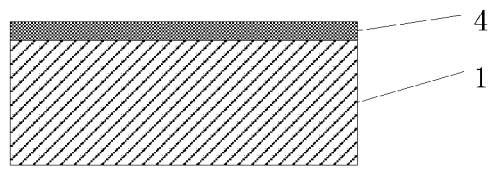
FIG. 5 is a schematic structure diagram of providing a substrate and a light absorption layer in the manufacturing method of the metal wire grid polarization plate provided by the embodiments of the present disclosure.
Figure 6:
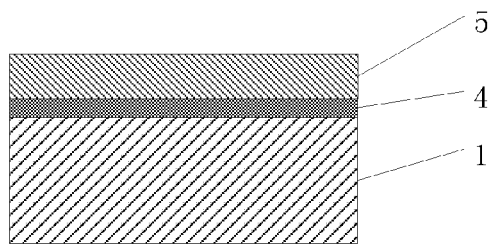
FIG. 6 is a schematic structure diagram of providing a metal layer on the light absorption layer in the manufacturing method of the metal wire grid polarization plate provided by the embodiments of the present disclosure.

In step 101, forming a light absorption layer 4 on a side of a substrate 1 (as shown in FIG. 5);

In step 102, forming a metal layer 5 on the light absorption layer 4 (as shown in FIG. 6);

In step 103, patterning the metal layer 5 and the light absorption layer 4 to form the metal wire grid 3 and the light absorption wire grid 2.

The method according to the embodiments of the present disclosure includes: forming the light absorption layer 4 on the side of the substrate 1, forming the metal layer 5 on the light absorption layer 4, and patterning the metal layer 5 and the light absorption layer 4 to form the metal wire grid 3 and the light absorption wire grid 2. In the metal wire grid polarization plate manufactured by the method according to the embodiments of the present disclosure, the light absorption wire grid 2 absorbs the light irradiating from the other side of the substrate 1 and having the vibration direction not parallel to the direction of the metal wire grid 3. Thus, Thus, in the case that the metal wire grid polarization plate is provided in the liquid crystal display panel, the situations that lots of ambient light are reflected by the liquid crystal display panel and the contrast ratio of the image displayed by the liquid crystal display panel is reduced can be prevented.

In the embodiments of the present disclosure, the light absorption layer 4 and the metal layer 5 are sequentially formed on the substrate 1; and then the metal layer 5 and the light absorption layer 4 are patterned to form the metal wire grid 3 and the light absorption wire grid 2. The substrate 1, the light absorption wire grid 2 and the metal wire grid 3 together form the metal wire grid polarization plate in the embodiments of the present disclosure as described above. The extension direction, the pitch P and the line width L of the light absorption wire grid 2 are equal to those of the metal wire grid 3, so that the light absorption effect of the light absorption wire grid 2 is ensured and the polarization effect of the metal wire grid 3 is not adversely influenced by the light absorption wire grid 2.

Figure 7:
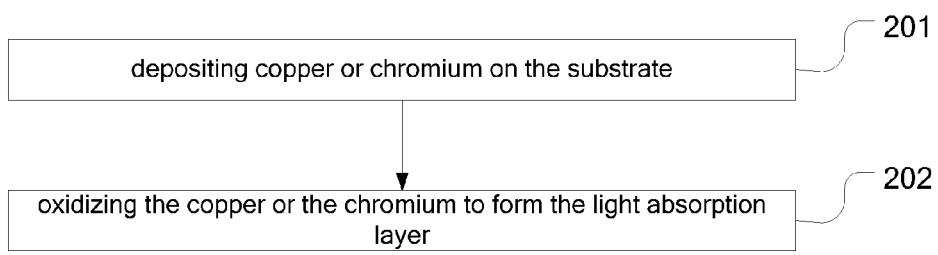
FIG. 7 is a flow diagram of forming the light absorption layer on the substrate provided by the embodiments of the present disclosure.

As shown in FIG. 7, in the embodiments of the present disclosure, forming the light absorption layer 4 on the side of the substrate 1 comprises:

Step 201, depositing copper or chromium on the substrate;

Step 202, oxidizing the copper or the chromium to form the light absorption layer 4.

In the case that a metal or a metal oxide is deposited, a metal powder or a metal oxide powder is generally used. However, copper oxide powder and chromium oxide powder are harmful to the human body. Ingestion or inhalation of copper oxide dust may cause metal fume fever, chills, body temperature rising and the like, which may be accompanied with respiratory tract irritation and other symptoms. Chromium in the chromium oxide is hexavalent, and the hexavalent chromium is easy to invade the body through the digestive tract, respiratory tract, skin and mucous membranes, the hexavalent chromium invading the human body may cause human allergy, hereditary genetic defects, cancer and other serious harm. In the embodiments of the present disclosure, copper or chromium is firstly deposited on the substrate 1, and then copper or chromium is oxidized to form copper oxide or chromium oxide; in this way, copper oxide powder and chromium oxide powder are avoided, and copper oxide and chromium oxide are prevent from entering into the air.

For example, depositing the copper or the chromium on the substrate comprises: depositing the copper or the chromium on the substrate 1 through a magnetron sputtering method. The magnetron sputtering method has a higher efficiency and a more uniform thickness. Of course, it should be noted by those skilled in the art that, an evaporation method for example is used to deposit copper or chromium on the substrate 1.

In the embodiments of the present disclosure, for example, oxidizing the copper or the chromium comprises: oxidizing the copper or the chromium on the substrate by using plasma; for example, the plasma is oxygen plasma. Of course, it should be noted by those skilled in the art that, other methods may also be used to oxidize the copper or the chromium.

Figure 8:
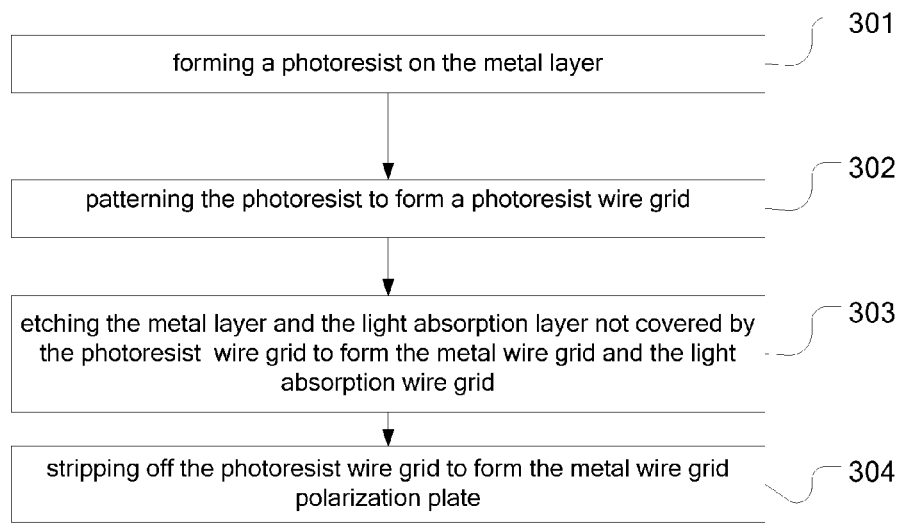
FIG. 8 is a flow diagram of patterning the metal layer and the light absorption layer to form the metal wire grid polarization plate provided by the embodiments of the present disclosure.
Figure 9:
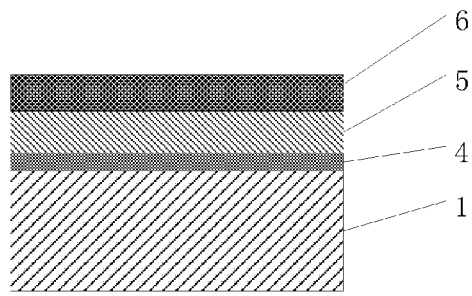
FIG. 9 is a schematic structure diagram of forming a photoresist on the metal layer in the manufacturing method of the metal wire grid polarization plate provided by the embodiments of the present disclosure.
Figure 10:
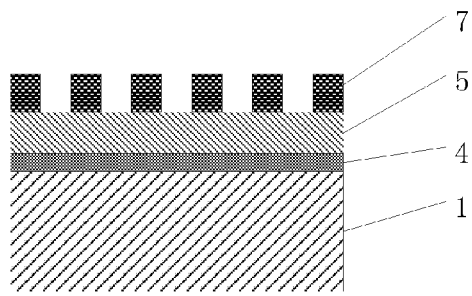
FIG. 10 is a schematic structure diagram of patterning the photoresist to form a photoresist wire grid in the manufacturing method of the metal wire grid polarization plate provided by the embodiments of the present disclosure.

As shown in FIG. 8, in the embodiments of the present disclosure, for example, patterning the metal layer 5 and the light absorption layer 4 to form the metal wire grid polarization plate includes:

Step 301, forming a photoresist 6 on the metal layer 5 (as shown in FIG. 9);

Step 302, patterning the photoresist 6 to form a photoresist wire grid 7 (as shown in FIG. 10);

Step 303, etching the metal layer 5 and the light absorption layer 4 not covered by the photoresist wire grid 7 to form the metal wire grid 3 and the light absorption wire grid 2; and Step 304, stripping off the photoresist wire grid 7 to form the metal wire grid polarization plate.

In the embodiments of the present disclosure, for example, patterning the photoresist 6 to form the photoresist wire grid 7 comprises: patterning the photoresist 6 to form the photoresist wire grid 7 through a nano imprinting method. That is, lines which are parallel to each other and disposed at equal interval are formed by the photoresist through the nano imprinting technology, and these lines constitute the photoresist wire grid 7.

For example, the line width L of each line of the photoresist wire grid 7 is 150±30 nm, and the thickness of each line of the photoresist wire grid 7 is 150±50 nm. Patterning the photoresist 6 through the nano imprinting technology has a higher production efficiency.

In the embodiments of the present disclosure, for example, etching the metal layer 5 and the light absorption layer 6 not covered by the photoresist wire grid 7 comprises: employing the photoresist wire grid as a mask to etch the metal layer 5 and the light absorption layer 4 which are not covered by the photoresist wire grid 7 by using an electron beam and not etch the metal layer 5 and the light absorption layer 4 covered by the photoresist wire grid 7, so as to form the metal wire grid 3 and the light absorption wire grid 2.

Of course, it should be noted by those skilled in the art that, a transfer printing method for example is used to pattern the metal layer 5 and the light absorption layer 4 to form the metal wire grid 3 and light absorption wire grid 2.

As shown in FIG. 2, a liquid crystal display panel is provided by the embodiments of the present disclosure, and the liquid crystal display panel includes the metal wire grid polarization plate 101 as described above, or the metal wire grid polarization plate manufactured by the manufacturing method as described above.

In the embodiments of the present disclosure, the metal wire grid polarization plate 101 is disposed on the side of the opposite substrate 10 closer to the array substrate 20, the light absorption wire grid 2 is disposed on the side of the substrate 1, and the metal wire grid 3 covers the light absorption wire grid 2. The light absorption wire grid 2 absorbs the light irradiating from the other side of the substrate (which is opposite to the side of the substrate disposed with the light absorption wire grid 2) and having the vibration direction not parallel to the direction of the metal wire grid 3. Thus, in the case that the metal wire grid polarization plate is provided in the liquid crystal display panel, the situations that lots of ambient light are reflected by the liquid crystal display panel and the contrast ratio of the image displayed by the liquid crystal display panel is reduced can be prevented.

In the embodiments of the present disclosure, the metal wire grid polarization plate 101 is provided in the liquid crystal cell 40 so as to avoid color shift or the dark state light leakage in the liquid crystal display panel. The optical path of the light emitted from the backlight source 30 and the optical path of the ambient light irradiating to the liquid crystal display panel provided by the embodiments of the present disclosure are as follows:

The light emitted from the backlight source 30 passes through the array substrate 20 and the liquid crystal layer 50 and then irradiates onto the metal wire grid polarization plate 101. Among the light emitted from the backlight source 30, the light rays having the vibration direction parallel to the direction of the metal wire grid 3 sequentially pass through the metal wire grid 3, the light absorption wire grid 2, the substrate 1 and the opposite substrate 10 (the opposite substrate 10 for example includes the color filter 102) and then form a color image on the display surface of the liquid crystal display panel, and the light rays having the vibration direction not parallel to the direction of the metal wire grid 3 are reflected by the metal wire grid 3.

In the case that the ambient light irradiates to the liquid crystal display panel provided by the embodiments of the present disclosure, among the ambient light, the light rays having the vibration direction parallel to the direction of the metal wire grid 3 sequentially pass through the color filter 102, the substrate 1, the light absorption wire grid 2, and the metal wire grid 3 and then enter into the liquid crystal layer 50, and the light rays having the vibration direction not parallel to the direction of the metal wire grid 3 are absorbed by the light absorption wire grid 2 of the metal wire grid polarization plate 101, and therefore the case that the contrast ratio of the display image of the liquid crystal display panel is reduced is avoided.

It should be noted that, in the liquid crystal display panel shown in FIG. 2, the metal wire grid polarization plate 101 is provided in the liquid cell 40; however, the embodiments of the disclosure are not limited thereto. For example, the metal wire grid polarization plate 101 is provided on a side of the opposite substrate 10 away from the array substrate; and in this case, the metal wire grid 3 is provided to be closer to the opposite substrate 10 than the light absorption wire grid 2.

It should be noted that, in the liquid crystal display panel shown in FIG. 2, the color filter 102 is provided on a side of the metal wire grid polarization plate 101 away from the array substrate 20; however, the embodiments of the disclosure are not limited thereto. For example, the color filter 102 is provided on a side of the metal wire grid polarization plate 101 facing the array substrate 20, as shown in FIG. 11.

Figure 11:
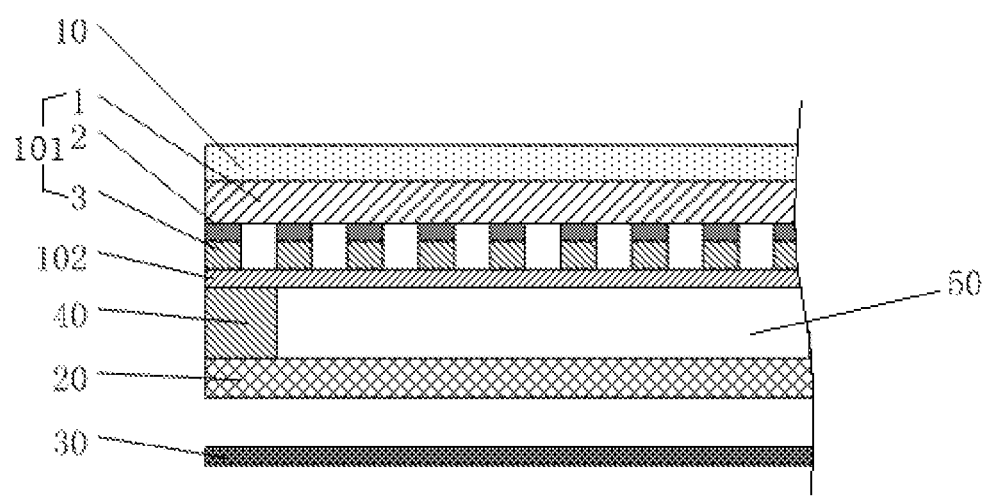
FIG. 11 is a schematic structure diagram of another liquid crystal display panel provided by the embodiments of the present disclosure.

It should be noted that, the liquid crystal display panel shown in FIG. 2 and FIG. 11 further comprise another polarization plate (not shown) between the backlight source 30 and the liquid crystal layer 50.

A display device is also provided by the embodiments of the present disclosure, and the display device includes the liquid crystal display panel as described above, the structure of the liquid crystal display panel for example is shown in FIG. 2.

In the embodiments of the present disclosure, the metal wire grid polarization plate 101 is disposed on the side of the opposite substrate 10 closer to the array substrate 20, the light absorption wire grid 2 is disposed on the side of the substrate 1, and the metal wire grid 3 covers the light absorption wire grid 2. The light absorption wire grid 2 absorbs the light irradiating from the other side of the substrate (which is opposite to the side of the substrate disposed with the light absorption wire grid 2) and having the vibration direction not parallel to the direction of the metal wire grid 3. Thus, in the case that the metal wire grid polarization plate is provided in the liquid crystal display panel, the situations that lots of ambient light are reflected by the liquid crystal display panel and the contrast ratio of the image displayed by the liquid crystal display panel is reduced can be prevented.

What are described above is related to the illustrative embodiments of the disclosure only and not limitative to the scope of the disclosure; the scopes of the disclosure are defined by the accompanying claims.

The present application claims the priority of the Chinese Patent Application No. 201610029288.4 filed on Jan. 15, 2016, which is entirely incorporated herein by reference as part of the disclosure of the present application.

What is claimed is:

1. A manufacturing method of a metal wire grid polarization plate, comprising:
    forming a light absorption layer on a side of a substrate;
    forming a metal layer on the light absorption layer; and patterning the metal layer and the light absorption layer to form a metal wire grid and a light absorption wire grid, wherein the metal wire grid is formed of a first metal, the light absorption wire grid is formed of an oxide of a second metal, and the second metal is different from the first metal, wherein the forming the light absorption layer on the side of the substrate comprises: depositing copper or chromium on the substrate; oxidizing the copper or the chromium by using oxygen plasma to form the light absorption layer; and the patterning the metal layer and the light absorption layer to form the metal wire grid and the light absorption wire grid comprises: forming a photoresist on the metal layer; patterning the photoresist to form a photoresist wire grid; etching the metal layer and the light absorption layer not covered by the photoresist wire grid to form the metal wire grid and the light absorption wire grid; and stripping off the photoresist wire grid to form the metal wire grid polarization plate.

2. The manufacturing method of the metal wire grid polarization plate according to claim 1, wherein depositing the copper or the chromium on the substrate comprises: depositing the copper or the chromium on the substrate through a magnetron sputtering method.

3. The manufacturing method of the metal wire grid polarization plate according to claim 1, wherein the patterning the photoresist to form the photoresist wire grid comprises: patterning the photoresist by a nano imprinting method to form the photoresist wire grid.

4. The manufacturing method of the metal wire grid polarization plate according to claim 1, wherein the etching the metal layer and the light absorption layer not covered by the photoresist wire grid comprises: employing the photoresist wire grid as a mask to etch the metal layer and the light absorption layer which are not covered by the photoresist wire grid by using an electron beam.

5. The manufacturing method of the metal wire grid polarization plate according to claim 1, wherein the metal wire grid is made of aluminum, silver, platinum, gold or a metal compound.

* * * * *